(12) United States Patent  
Forster (10) Patent No.: US 9,412,061 B2  
(45) Date of Patent: Aug. 9, 2016

(54) SENSING RADIO FREQUENCY IDENTIFICATION DEVICE WITH REACTIVE STRAP ATTACHMENT

(75) Inventor: Ian J. Forster, Essex (GB)

(73) Assignee: Avery Dennison Corporation, Glendale, CA (US)

( * ) Notice: Subject to any disclaimer, the term of this patent is extended or adjusted under 35 U.S.C. 154(b) by 508 days.

(21) Appl. No.: 12/856,229

(22) Filed: Aug. 13, 2010

(65) Prior Publication Data

US 2012/0038461 A1 Feb. 16, 2012

(51) Int. Cl.
*H04Q 5/22* (2006.01)
*G06K 19/077* (2006.01)
*H04Q 9/00* (2006.01)

(52) U.S. Cl.
CPC .... *G06K 19/07749* (2013.01); *G06K 19/07752* (2013.01); *G06K 19/07756* (2013.01); *H04Q 9/00* (2013.01); *H04Q 2209/47* (2013.01)

(58) Field of Classification Search
CPC .................. G06K 19/0723; G06K 19/07749
USPC .............. 340/10.1, 572.7, 693.9, 855.1; 29/25.41, 25.42; 343/906, 857
See application file for complete search history.

(56) References Cited

U.S. PATENT DOCUMENTS

| | | | |
|---|---|---|---|
| 6,320,509 B1 | 11/2001 | Brady et al. | |
| 6,891,110 B1 * | 5/2005 | Pennaz | G06K 19/07749 174/255 |
| 7,158,033 B2 | 1/2007 | Forster | |
| 7,159,774 B2 | 1/2007 | Woodard et al. | |
| 7,298,343 B2 | 11/2007 | Forster et al. | |
| 7,397,378 B1 | 7/2008 | Leason | |
| 7,489,246 B2 | 2/2009 | Himberger et al. | |
| 7,510,985 B1 * | 3/2009 | Boenke | B23K 26/364 257/E21.328 |

(Continued)

FOREIGN PATENT DOCUMENTS

| | | |
|---|---|---|
| DE | 102009005100 | 7/2010 |
| EP | 1912062 A1 | 4/2008 |

(Continued)

OTHER PUBLICATIONS

International Search Report dated Nov. 9, 2011 for International Application No. PCT/US2011/047746 filed Aug. 15, 2011.

(Continued)

*Primary Examiner* — George Bugg
*Assistant Examiner* — Anthony D Afrifa-Kyei
(74) *Attorney, Agent, or Firm* — Avery Dennison Corporation (57) ABSTRACT

A sensing radio frequency identification device with a strap that is reactively attached to an antenna by a sensing material is provided. In one embodiment, the RFID device includes an antenna, an interposer (or strap), an integrated circuit coupled to the interposer, and a sensing material disposed between the interposer and the antenna. As the relative permittivity of the sensing material changes in response to its exposure to an environmental condition, the reactive coupling between the interposer and the antenna likewise changes thereby causing changes in one or more parameters of communication such as frequency. The sensing material 70 may be a dielectric material selected to have a relative permittivity (i.e., dielectric constant) that varies based on exposure to one or more environmental conditions such as, for example, temperature (i.e., hot or cold), humidity, chemical, biological entity, nuclear, physical, pressure, light, liquid, nuclear and/or other condition.

13 Claims, 4 Drawing Sheets

(56) References Cited

U.S. PATENT DOCUMENTS

| | | | |
|---|---|---|---|
| 7,570,169 B2* | 8/2009 | Li | G08B 13/2417 340/572.7 |
| 2003/0112192 A1 | 6/2003 | King et al. | |
| 2003/0122721 A1 | 7/2003 | Sievenpiper | |
| 2004/0178958 A1 | 9/2004 | Kadambi et al. | |
| 2005/0200539 A1 | 9/2005 | Forster et al. | |
| 2005/0248488 A1 | 11/2005 | Modro | |
| 2006/0055542 A1 | 3/2006 | Forster et al. | |
| 2006/0091225 A1 | 5/2006 | Forster et al. | |
| 2006/0244606 A1 | 11/2006 | Li et al. | |
| 2007/0080233 A1 | 4/2007 | Forster et al. | |
| 2007/0152829 A1 | 7/2007 | Lindsay et al. | |
| 2007/0216534 A1 | 9/2007 | Ferguson et al. | |
| 2007/0273515 A1* | 11/2007 | MacKenzie | G06K 19/07749 340/572.1 |
| 2009/0108996 A1 | 4/2009 | Day | |
| 2009/0219158 A1 | 9/2009 | Nikitin et al. | |
| 2009/0230198 A1* | 9/2009 | Armijo | B32B 38/0004 235/492 |
| 2009/0261953 A1 | 10/2009 | Kang et al. | |
| 2010/0007569 A1 | 1/2010 | Sim et al. | |
| 2010/0072287 A1 | 3/2010 | Kai et al. | |
| 2010/0123582 A1 | 5/2010 | Smith et al. | |
| 2011/0101996 A1* | 5/2011 | Potyrailo | G01D 21/00 324/655 |

FOREIGN PATENT DOCUMENTS

| | | |
|---|---|---|
| EP | 2182581 | 5/2010 |
| WO | 2005096221 | 10/2005 |

OTHER PUBLICATIONS

Written Opinion and International Preliminary Report on Patentability dated Feb. 19, 2013 for International Application No. PCT/US2011/047746 filed Aug. 15, 2011.

* cited by examiner

SENSING RADIO FREQUENCY IDENTIFICATION DEVICE WITH REACTIVE STRAP ATTACHMENT

FIELD OF THE INVENTION

The present invention is directed to radio frequency identification (RFID) devices and, more particularly, to a sensing radio frequency identification device with a strap that is reactively attached to an antenna by a sensing material.

BACKGROUND OF THE INVENTION

Radio frequency identification (RFID) devices, also sometimes known as inlays, include an integrated circuit and an antenna. An RFID inlay may be used directly in some applications and in others undergo one or more manufacturing operations in order to complete the RFID tag, label or other enclosure housing the RFID device.

RFID tags and labels are widely used to associate an object with an identification code. RFID tags and labels generally have a combination of antennas and analog and/or digital electronics, which may include, for example, communications electronics, data memory, inputs, outputs and control logic.

In many applications it is desirable to reduce the size of the electronics as small as possible. In order to interconnect the small chip (integrated circuit) of the RFID device with the antenna, an interposer (sometimes referred to as a "strap") may be used to facilitate manufacturing. An interposer may include conductive leads or pads that are electrically coupled to the contact pads of the chip for coupling to the antenna. The interposer pads provide a larger effective electrical contact area than an integrated circuit, which must be precisely aligned for direct placement without an interposer. The larger area provided by the interposer reduces the accuracy required for placement of chips during manufacture while still providing effective electrical connection.

RFID devices may be active, which include a power source (such as a battery), or passive, which do not. In the case of passive RFID devices, in order to retrieve the information from the chip, an RFID reader sends an excitation signal to the RFID device. The excitation signal energizes the RFID device, which transmits the stored information back to the reader. The RFID reader receives and decodes the information from the RFID device. In general, RFID devices can retain and transmit enough information to uniquely identify individuals, packages, inventory and the like.

Many items in the marketplace are packaged, singly or in bulk, in a container for shipping and/or storage. The manufacturers, distributors, retailers, and/or customers often use RFID devices to identify the containers at various points throughout the distribution chain of the items. Some such items may be sensitive to one or more environmental conditions such as temperature (i.e., heat or cold), humidity, chemicals, biological elements, radiation, light, liquid, a physical condition (e.g., pressure) or other condition. Consequently, it is important to the manufacturers, distributors, retailers, and/or customers of such items to determine whether the items have been exposed to any undesirable environmental conditions that may affect the item's use or desirability. In addition, it would be desirable to make such determination in a cost effective and efficient manner using RFID devices and RFID readers already in use to track the location of such items. These and other advantages may be provided by one or more embodiments of the present invention.

SUMMARY OF THE INVENTION

The present invention provides a sensing radio frequency identification (RFID) device with a strap that is reactively attached to an antenna by a sensing material. In one embodiment, the RFID device includes an antenna, an interposer (or strap), an integrated circuit coupled to the interposer, and a sensing material disposed between the interposer and the antenna. As the relative permittivity of the sensing material changes in response to its exposure to an environmental condition, the reactive coupling between the interposer and the antenna likewise changes thereby causing changes in one or more parameters of communication such as frequency. The sensing material 70 may be a dielectric material selected to have a relative permittivity (i.e., dielectric constant) that varies based on exposure to one or more environmental conditions such as, for example, temperature (i.e., hot or cold), humidity, chemical, biological entity, nuclear, physical, pressure, light, liquid, nuclear and/or other condition.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings, which are not necessarily to scale.

DETAILED DESCRIPTION OF ILLUSTRATIVE EMBODIMENTS

The present invention is now illustrated in greater detail by way of the following detailed description which includes the best presently known mode of carrying out the invention. However, it should be understood that this description is not to be used to limit the present invention, but rather, is provided for the purpose of illustrating the general features of the invention.

In the following description, for purposes of explanation and not limitation, specific details are set forth, such as particular materials, antennas, antenna shapes, interposer shapes, integrated circuits, assembly configurations and locations, etc. in order to provide a thorough understanding of the present invention.

However, it will be apparent to one skilled in the art that the present invention may be practiced in other embodiments that depart from these specific details. Detailed descriptions of particular materials, antennas, antenna shapes, interposer shapes, integrated circuits, assembly configurations and locations are omitted so as not to obscure the description.

Active RFID systems use "on-board" power (such as from a battery) to radiate information from the RFID device. Passive RFID devices re-radiate energy from an interrogating beam to communicate information from the RFID device in a process commonly described as modulated backscatter or modulated reflection. The present invention can change the nature of this backscatter by, for example, changing the amplitude and/or phase response with frequency, and other communication characteristics based on one or more environmental conditions. The alteration of the backscattered signal will also be associated with a change in the strength of the radio frequency field needed to make the device operate with frequency, which, when combined with measurements of complex backscatter, can assist in locating a small sensor response in noise.

Figure 1:
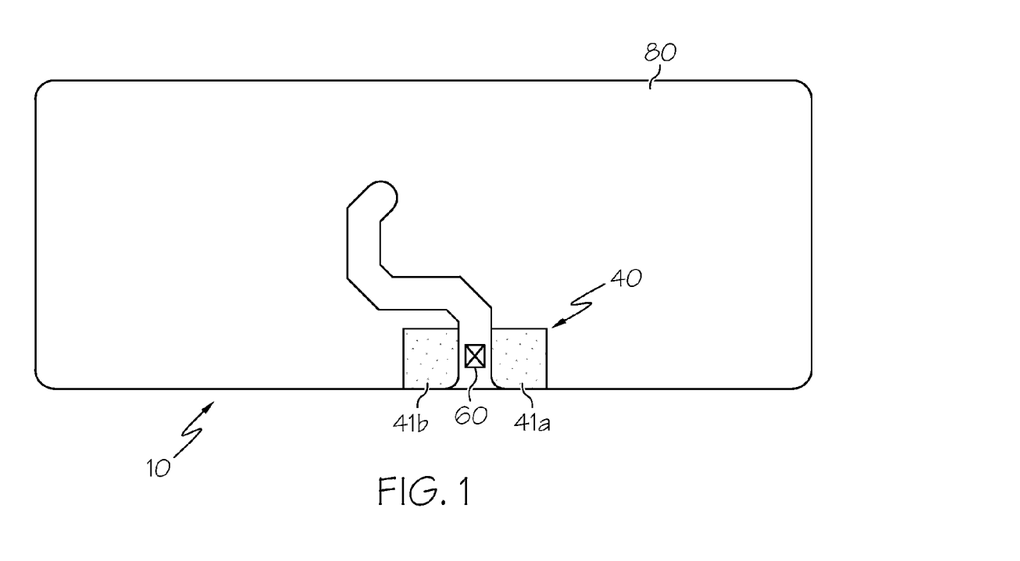
FIG. 1 is a plan view of an RFID inlay according to an example embodiment of the present invention.
Figure 2:
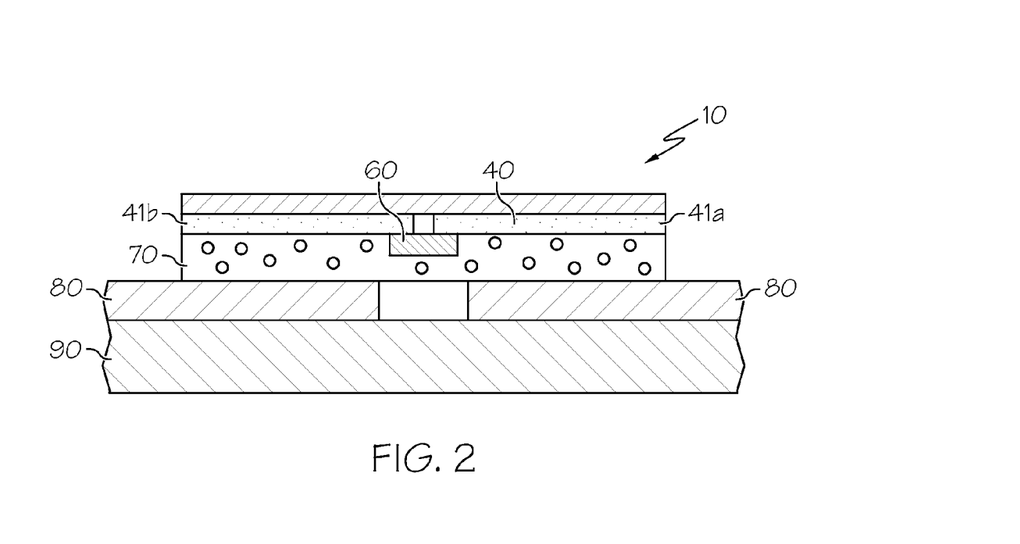
FIG. 2 is a partial cross-sectional view of the RFID inlay of FIG. 1.

FIGS. 1 and 2 depict an RFID device 10 according to an example embodiment of the present invention. Specifically, the RFID device 10 includes an interposer substrate 50 attached to a conductive interposer 40. In this embodiment, the interposer comprises two portions 41a and 41b connected to the two pads of the integrated circuit 60 (or IC 60) although other embodiments may include three or more IC pads and interposer portions. A sensing material 70 is attached to the interposer 40. An antenna 80, which is attached on a first side to an antenna substrate 30, is attached on its second side to the sensing material 70.

The sensing material 70 has electrical properties that are alterable in response to exposure to one or more environmental conditions. These properties include complex dielectric constant and conductivity. The sensing material 70 may be comprised of one or more layers with only a subset of the total number of layers having an electrical property that is alterable in response to exposure to the one or more environmental conditions. Alternatively the sensing material may be distributed in areas, such as dots, surrounded by a second functional material such as an adhesive. For example, a first layer may include a dielectric that does not have an electrical property that is alterable in response to exposure to one or more environmental conditions. A second layer may comprise a pressure sensitive adhesive whose dielectric and/or conductive properties vary in response to changes in pressure.

In this embodiment, the interposer 40 is coupled to the antenna 80 primarily (mostly) via capacitive coupling through sensing material 70. The sensing material 70 may be a dielectric material selected to have a complex dielectric constant and conductivity that varies based on exposure to one or more environmental conditions such as, for example purposes only, temperature (i.e., hot or cold), humidity, chemical, biological entity, nuclear, physical, pressure, light, liquid, nuclear and/or other condition(s). In addition, the physical size and shape of the material may alter, which will alter the coupling between the interposer and antenna. Thus, as the complex dielectric constant and conductivity of the sensing material 70 changes, the capacitance coupling the interposer 40 and the antenna 80 likewise changes. It will be noted that material 70 is may be placed only below the pads of the interposer 41a and 41b or may be placed, as shown in FIG. 2, in a layer. In this case the path directly across the antenna, which can be considered as a capacitor with a certain loss resistance, appears in parallel with the interposer and its connection, and will contribute to the overall sensor response.

More specifically, as the complex dielectric constant, meaning involving phase and amplitude, and conductivity of the sensing material 70 changes (based on its exposure to one or more environmental conditions), the coupling between the interposer 40 and the antenna 80 likewise changes (the interposer and antenna are reactively or conductively coupled) thereby causing factors such as the tag sensitivity with frequency (that is the minimum power incident at the tag to make it operate) and the complex backscatter of the tag 10 to change. Depending on the embodiment, parameters of the RFID device 10 affected may include the transmission frequency and/or power (for active RFID devices), backscatter signal strength (for passive RFID devices), frequency response of backscatter signal (for passive RFID devices), relative levels of upper and lower sidebands, and/or other parameters. Near field the measure of energy adsorption characteristics of the device as a simple resonator, not utilizing the characteristics of the RFID communication. In summary, the far and near field response of the RFID device is influenced by an environmental condition sensed by the sensing material 70.

An RFID reader, which is suitable for receiving the desired frequency bands, may determine the frequency response (or other parameter) that is received from the RFID device 10, which may be processed (e.g., compared with data stored in memory) to determine the environmental condition(s) to which the RFID device 10 is presently (or was previously) exposed. For example, a passive RFID device may be provided wherein the electrical properties (e.g., frequencies output by the radiating element (e.g., the antenna and the sensing material)) vary based on an environmental condition, such as temperature, to which the RFID device is, or was, exposed. Based on the frequency used by the RFID device 10 to communicate with the reader, the RFID device 10 may thus provide information about the temperature along with the serial number of (or other information from) the RFID device 10.

In some instances, the sensing material 70 may be selected so that the alterable electrical parameter (e.g., relative permittivity) is permanently modified when exposed to a selected environmental condition. Consequently, even though the item to which the RFID device 10 is attached may not be exposed to the environmental condition when the RFID device 10 communicates with the RFID reader, the sensing RFID device 10 can indicate a previous exposure to the selected environmental condition. In other instances, the sensing material 70 may be selected so that its electrical parameter is not permanently modified when exposed to the selected environmental condition but is modified only while being exposed to the environmental condition (e.g., temperature). In such embodiments, the invention determines whether the item (and the RFID device 10) are exposed to the environmental condition at the time and location of communication with the RFID reader.

Figure 3:
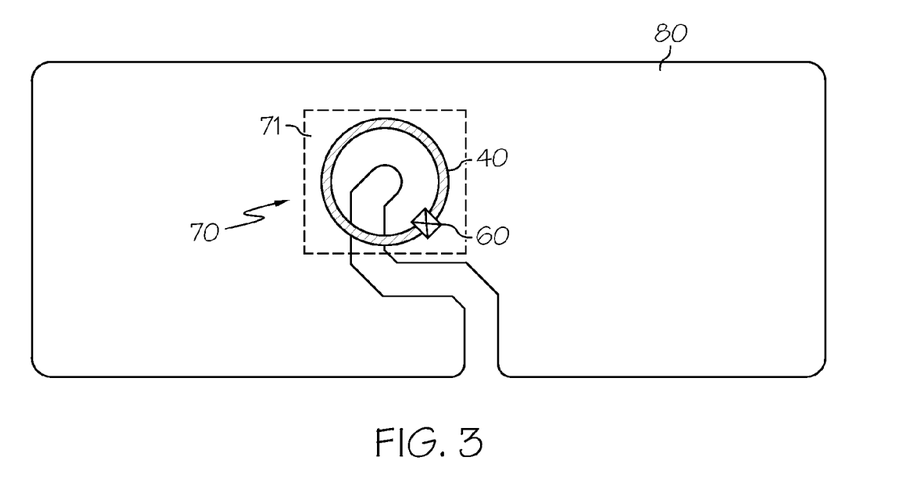
FIG. 3 is a plan view of an RFID inlay according to another example embodiment of the present invention.

FIG. 3 depicts another embodiment of the present invention in which the interposer 40 is coupled to the antenna 80 (through the sensing material 70) at a different location on the antenna 80. The conductive interposer 40 of this embodiment is circular with a single opening (not shown) at the integrated circuit 60. Each side of the opening of the interposer 40 is electrically connected to a pad of the integrated circuit 60. The sensing material 70 is disposed over an area 71 so that the sensing material 70 is between the antenna 80 and all portions of the interposer 40, but is not coextensive with the antenna 80 (although it could be). In this embodiment, the coupling between the interposer 40 and the antenna 80 may be primarily (mostly) magnetic although the overall radiating response is affected by the dielectric material 70. In other words, even though the coupling is primarily magnetic, changes in the sensing material 70 (resulting from exposure to an environmental condition) will result in changes in the lesser capacitive coupling that will affect one or more communication parameters of the radiating element (e.g., frequency).

Figure 4:
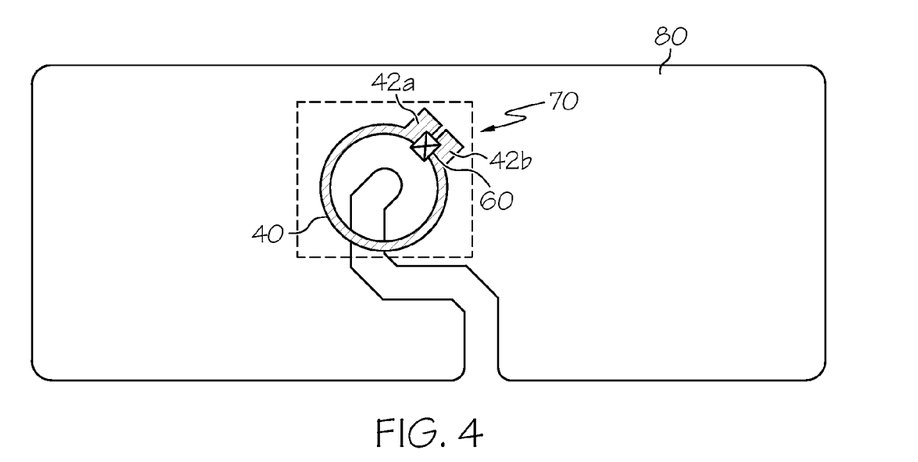
FIG. 4 is a plan view of an RFID inlay according to yet another example embodiment of the present invention.

FIG. 4 depicts yet another embodiment of the present invention in which the conductive interposer 40 is coupled to the antenna 80 (through the dielectric material 70) at the same location on the antenna 80 as the embodiment of FIG. 3. Again, the conductive interposer 40 of this embodiment is circular with a single opening (not shown) at the integrated circuit 60. Each side of the opening of the interposer 40 is electrically connected to a pad of the integrated circuit 60. The interposer 40 includes two rectangular portions 42a and 42b, which increase the surface area of the interposer 70 thereby increasing the capacitance (and capacitive coupling) between the interposer 70 and the antenna 80. The increased capacitive coupling (relative to the embodiment of FIG. 3) caused by the added rectangular portions increases the affect of the changes in the relative permittivity of sensing material 70 resulting from exposure to an environmental condition. In this embodiment, the coupling between the interposer 40 and the antenna 80 is both magnetic and capacitive. It is worth noting that while the interposers of FIGS. 3 and 4 are circular, the interposers 70 of other embodiments may be of any suitable shape (e.g., square, rectangular, oval etc.) to provide the desired magnetic and/or capacitive coupling with the antenna 80. Likewise, the antenna 80 may be of any size, shape, and/or configuration to provide the desired radiating parameters and magnetic and/or capacitive coupling with the interposer 40.

Figure 5:
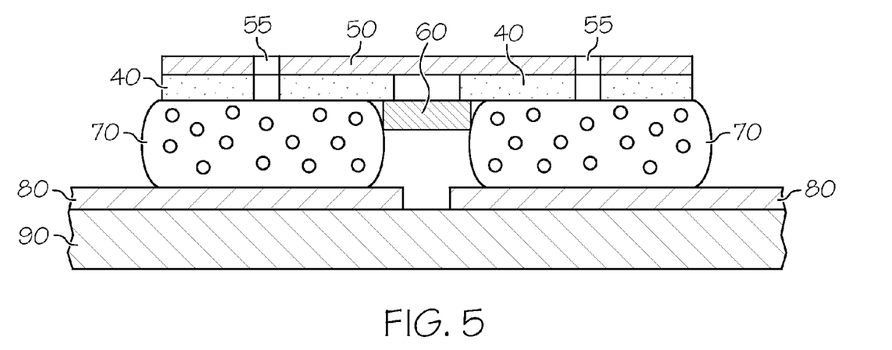
FIG. 5 is a partial cross-sectional view of an RFID inlay incorporating apertures according to an example embodiment of the present invention.

FIG. 5 depicts an alternate configuration for embodiments of the present invention. This configuration is similar to the configuration of FIG. 1 except that apertures 55 are provided that extend through the interposer substrate 50 and through the interposer 40 to the sensing material 70 to expose the dielectric material 70 to environmental conditions. While some environment conditions might not require such access (e.g., nuclear radiation, temperature), other conditions such as chemicals and humidity may require, or benefit from, such access provided by the apertures 55. While only two apertures 55 are depicted in the figure, any number of apertures may be employed to provide the desired access of the sensing material 70 to the environmental conditions. For example, apertures 55 may be provided around the entire circular interposer 40 of the embodiments of FIGS. 3 and 4 and/or multiple apertures 55 may be provided through the rectangular portions 42a and 42b of the embodiment of FIG. 4. Consequently, the apertures 55 are an optional feature that may be incorporated into any of the embodiments described herein. Finally, the, label, tag, or other enclosure housing the RFID device 10 may also require apertures to provide access of the environmental condition to the apertures 55 of the RFID device. FIG. 5, shows the sensing material is not directly disposed under the chip (like it is in FIG. 1). Instead, the sensing material bridges the antenna. The bridging can have a direct effect on the antenna as described earlier. For example, if the material 70 is very conductive, and extends across the antenna, the material might reduce the performance in an unacceptable way, although in other cases the material contributes to increasing the sensor response.

Figure 6:
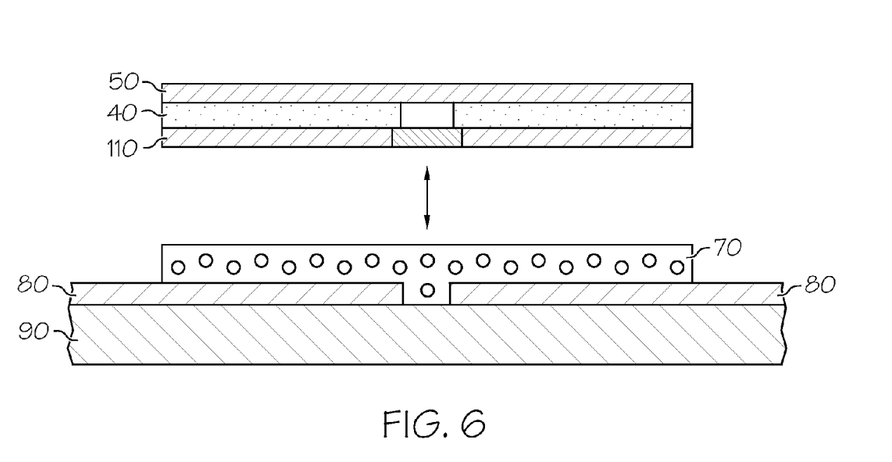
FIG. 6 is a partial cross-sectional view of an unassembled RFID inlay according to another example embodiment of the present invention.

FIG. 6 depicts another configuration in which the interposer 40 is coated with an activator chemical that, when brought into contact with a passive coating on the antenna, activates the sensing capabilities. The activator chemical 110 typically is not brought into contact with the passive coating 120 until the RFID device is packaged, deployed, or otherwise put into use. This optional method of assembly may be used to construct any of the embodiments described herein. The passive coating 120 may coat all or a portion of the antenna 80 or coat only a pre-deposited layer of the sensing material 70 as shown in FIG. 6. In other embodiments, the activator chemical may coat all or a portion of the antenna 80 or coat only a pre-deposited layer of the sensing material 70 and the passive coating may coat the interposer 70. In either instance, the RFID device is inactive until the two portions of the RFID device 10 are attached to thereby activate the sensing material and couple the antenna 80 to the interposer 40 and integrated circuit 60. In an alternate version of this concept, the activator, or sensing material, may be micro encapsulated. The capsules are designed to be adequately robust to remain intact under the forces associated with assembly of the interposer to the antenna, but may burst at a higher pressure, allowing the sensing capability to be activated later. Alternatively the activator may be held in spheres with a defined melting point, such as a wax, or may become chemically active under exposure to a defined form of radiation such as UV or temperature.

The sensing material 70 may be selected to detect a particular environmental condition. For example, in order to detect a chemical or biological entity, a material whose complex dielectric constant and conductivity or other electrical parameter changes in response to exposure (e.g., absorption) of the chemical or biological entity may be selected. Similarly, to detect exposure to radiation a material whose electrical performance degrades in response to alpha, beta, gamma, X-ray or ultraviolet radiation may be used. As discussed, the sensing material 70 may comprise one or more layers and in which only one layer, any combination of layers, or all layers have an electrical parameter that changes in response to the same or different environmental condition. In addition, the pattern of the sensing material may be of any suitable pattern to provide the desired coupling.

Figure 5A:
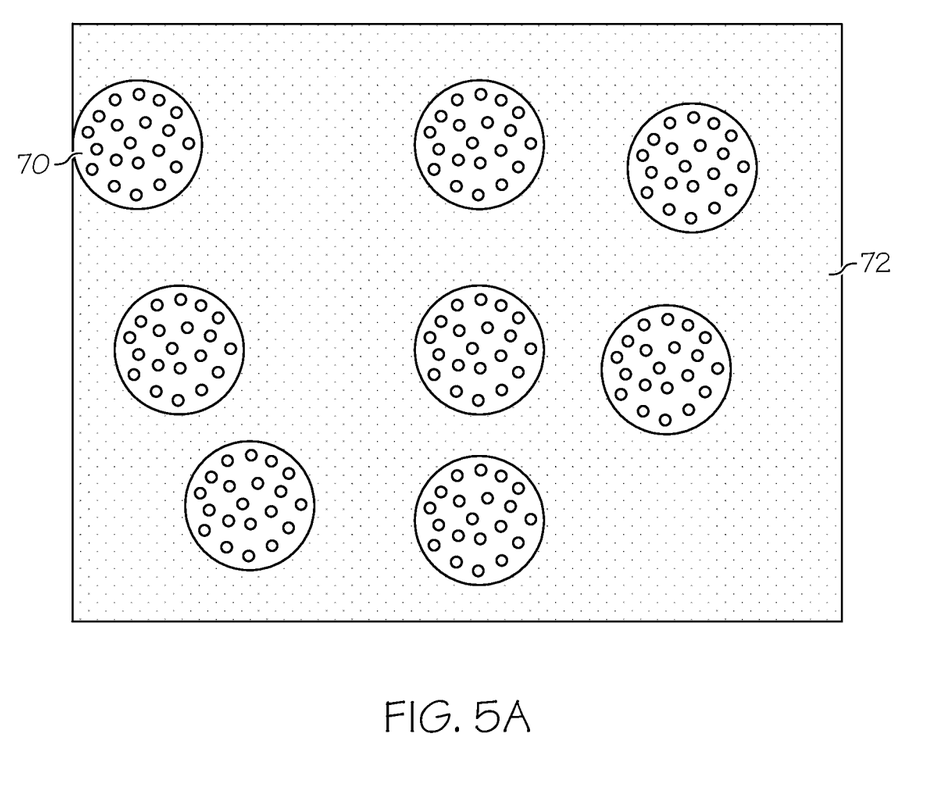
FIG. 5A is a plan view of a pattern of sensing material disposed in an adhesive layer.

In general, the interposer needs to be secured to the antenna, using some form of adhesive. In a number of cases, the adhesive may also be the sensor material. If the need for adhesion and sensing are not compatible, the two functions may be combined by providing a pattern of sensing material dispersed 70 within the adhesive 72. The sensing material 70 can be deposited under an interposer pad and the antenna and is generally provided in the proximity of the interposer and antenna. The pattern may be formed by various methods of printing, such as flexographic, gravure, rotary or jetting. The inverse pattern will also work, with dots of adhesive in an area of sensing material, and will depend on how the analyzed material needs to get to the sensor material. While FIG. 5A shows a random pattern of sensing material 70, the pattern may incorporate any shape or configuration, be arranged in rows and columns or concentrated in specific areas to increase the coupling between the interposer and the antenna.

The sensing material enables the coupling (reactive or conductive) between the interposer and antenna due to a change in the sensing material or activation of the sensing material.

The present invention may be used to sense one or more environmental conditions. For example, two, three or more sensing RFID devices 10 may be attached to one object with each sensing RFID device 10 being configured to sense a different environmental condition. For example, a first sensing RFID device may be configured to sense temperature above a predetermined threshold, a second sensing RFID device may be configured to sense humidity above a predetermined threshold, and a third sensing RFID device may be configured to sense exposure to one or more chemicals.

While the embodiments described herein vary the reactive coupling between the interposer 40 and the antenna 80 by varying the capacitive coupling, other embodiments may alternately or additionally vary the magnetic coupling (as a result of the sensing material being exposed to one or more environmental conditions). In addition, the coupling may be conductive, that is the resistance of the material between the interposer and the antenna may vary in response to the sensed material, or the coupling may be a combination of conductive and reactive. Similarly, while the above embodiments herein vary the reactive coupling between the interposer 40 and the antenna 80, other embodiments may not employ an interposer and vary the reactance (e.g., the capacitance) between the pads of the integrated circuit 60 and the antenna (as a result of the sensing material being exposed to one or more environmental conditions).

The term integrated circuit is intended to encompass the broad range of devices, which may vary in complexity and functionality. The antenna may be any of variety of antennas of any suitable geometry and configuration for providing the desired coupling, reception and transmission of signals.

Magnetic coupling and/or capacitive coupling are referred to collectively herein as "reactive coupling," in contrast to direct electrical coupling by electrically conductive material. References herein to primarily magnetic or primarily capacitive reactive coupling refer to coupling that is predominantly magnetic or capacitive, respectively. It will be appreciated that coupling that is primarily magnetic may also include some capacitive coupling. Conversely, coupling that is primarily capacitive may also include some inductive (magnetic) coupling as a secondary coupling mechanism. Systems using primarily capacitive or magnetic coupling are referred to herein collectively as utilizing reactive coupling. Capacitive, magnetic, or reactive coupling, as the terms are used herein, may also include some direct conductive coupling, albeit not as the primary type of electrical coupling.

Embodiments of the present invention may be manufactured using any suitable method. For example, the interposer 40 may be formed of a conductive ink printed or otherwise deposited on the interloper substrate 50. The integrated circuit may be attached to the interposer 40 via an adhesive or other suitable method. Similarly, the sensing material may be attached to the antenna and/or the interposer via an adhesive.

It is to be understood that the foregoing illustrative embodiments have been provided merely for the purpose of explanation and are in no way to be construed as limiting of the invention. Words used herein are words of description and illustration, rather than words of limitation. In addition, the advantages and objectives described herein may not be realized by each and every embodiment practicing the present invention. Further, although the invention has been described herein with reference to particular structure, materials and/or embodiments, the invention is not intended to be limited to the particulars disclosed herein. Rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention.

What is claimed is:

1. An RFID device, comprising:
   an antenna attached to an antenna substrate having a first and second side with the first side attached to the antenna substrate;
   an interposer and an interposer substrate with the interposer attached to the interposer substrate;
   an integrated circuit coupled to the interposer;
   a sensing material having at least one layer with electrical properties, the sensing material disposed between the interposer and the antenna is attached on the second side to the sensing material wherein the interposer is coupled to the antenna through the sensing material primarily via magnetic coupling and at least one aperture disposed through the interposer substrate and the interposer to the sensing material; and
   wherein the electrical characteristics of the sensing material changes in response to exposure to an environmental condition, and the magnetic coupling between the interposer and the antenna changes and wherein a portion of one of the interposer and the antenna is coated with an activator chemical and a portion of a remaining one of the interposer and the antenna is coated with a passive material such that the sensing material is activated in response to the activator chemical contacting the passive material.

2. The RFID device according to claim 1, wherein the sensing material is formed by:
   coating a portion of one of the interposer and the antenna with an activator chemical;
   coating a portion of the other of the interposer and the antenna with a passive material; and
   bringing the activator chemical into contact with the passive material.

3. The RFID device according to claim 1, wherein the sensing material is formed of a plurality of layers and wherein only a subset of the plurality of layers has a complex dielectric constant and/or conductivity that changes in response to exposure to the environmental condition.

4. The RFID device according to claim 1, wherein a parameter of communications output from the antenna changes due to a change in the electrical characteristics of the sensing material.

5. A method of sensing and communicating information, comprising:
   providing a radio frequency identification (RFID) device that includes an interposer coupled to an integrated circuit such that the interposer is attached to an interposer substrate, and an antenna attached to an antenna substrate having a first and second side, with the first side attached to the antenna substrate the step of providing the RFID device further includes coating a portion of one of the interposer and the antenna with an activator chemical; coating a portion of a remaining one of the interposer and the antenna with a passive material; and a sensing material is activated in response to the activator chemical contacting the passive material;
   providing a sensing material having at least one layer with electrical properties, the sensing material in proximity to the interposer and antenna wherein the interposer is coupled to the antenna through the sensing material primarily via capacitive coupling and the antenna is attached on its second side to the sensing material;
   providing an aperture through the interposer substrate and through the interposer to the sensing material;
   changing an electrical parameter of the sensing material in response to the sensing material sensing an environmental condition; and
   coupling the interposer to the antenna as a result of the changing electrical parameter of the sensing material wherein the coupling between the interposer and the antenna changes.

6. The method according to claim 5, including a further step of altering a communication parameter of the RFID device as a result of the change in the electrical parameter of the sensing material;
   remotely measuring the changed communication parameter; and wherein,
   said altering comprises changing a frequency used for said communicating as a result of the change in the electrical parameter.

7. The RFID device according to claim 5, wherein the environmental condition includes a condition from the group of: temperature, radiation, a biological entity, and a chemical.

8. The RFID device according to claim 5, wherein the material is formed of a plurality of layers and wherein only a subset of the plurality of layers has an electrical property that changes in response to exposure to the environmental condition.

9. An RFID device, comprising:
   an antenna attached to an antenna substrate having a first and second side with the antenna attached to the antenna substrate on the first side;
   an interposer and an interposer substrate with the interposer attached to the interposer substrate;
   an integrated circuit reactively coupled to the interposer;
   a sensing material having at least one layer with electrical properties, the sensing material bridging a space between the antenna and the interposer and at least one aperture disposed through the interposer substrate and the interposer to the sensing material the antenna is attached to the sensing material on its second side, the sensing material is formed by coating a portion of one of the interposer and the antenna with an activator chemical; coating a portion of a remaining one of the interposer and the antenna with a second material; and bringing the activator chemical into contact with the second material; and
   wherein the sensing material has an electrical property alterable in response to exposure to an environmental condition to either reactively or conductively couple the interposer to the antenna and the coupling between the interposer and the antenna changes.

10. The RFID device according to claim 9, wherein the environmental condition includes a condition from the group of: temperature, radiation, a biological entity, and a chemical.

11. The RFID device according to claim 9, wherein the electrical property alterable in response to exposure to an environmental condition comprises relative permittivity.

12. The RFID device according to claim 9, wherein the sensing material is formed of a plurality of layers and wherein only a subset of the plurality of layers has an electrical property that changes in response to exposure to the environmental condition.

13. The RFID device according to claim 9, wherein a parameter of communications output from the antenna changes due to a change in the electrical property of the dielectric sensing material.

* * * * *